Patented Mar. 26, 1946

2,397,134

UNITED STATES PATENT OFFICE 2,397,134

PREPARATION OF ACETYLPROPYL CHLORIDE

Sylvan E. Forman, Baltimore, Md., assignor to U. S. Industrial Chemicals, Inc., New York, N. Y., a corporation of Delaware No Drawing. Application February 21, 1945, Serial No. 579,159

1 Claim. (Cl. 260—593)

This invention relates to an improved procedure for the preparation of acetylpropyl chloride which is useful as an intermediate in the preparation of organics for medicinal and other purposes.

Acetylpropyl chloride or 5-chloro, 2-pentanone is a colorless liquid which boils at 71°–72° C. at 20 mm. pressure. The compound is known. The method of preparation employed heretofore involves the formation of acetylpropyl alcohol which is thereafter converted to the chloride. Acetylpropyl alcohol is relatively unstable and readily forms the analogous ether. The yield by the known method is relatively low.

It is the object of the present invention to provide a simple, efficient and economical method of producing acetylpropyl chloride which avoids the difficulties mentioned and is adapted for commercial operation.

Other objects and advantages of the invention will be apparent as it is better understood by reference to the following specification, in which the preferred procedure is described.

The novel method of preparing acetylpropyl chloride according to the invention depends upon the reaction of acetylbutyrolactone with aqueous hydrochloric acid. The reaction is as follows:

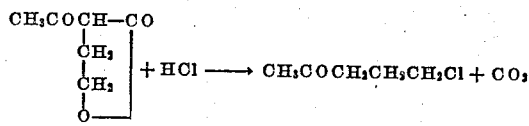

Acetylbutyrolactone is prepared preferably by the procedure described in the co-pending application of William L. Johnson, Serial No. 578,557, filed February 17, 1945. This procedure in general consists of reacting ethylene oxide with ethyl acetoacetate under alkaline conditions at a temperature preferably between 0° and −5° C. Following the reaction, the mixture is neutralized with glacial acetic acid and extracted with benzol. The benzol extract is then fractionated at atmospheric pressure to remove benzol, alcohol and water and thereafter at reduced pressures to recover unreacted ethyl acetoacetate and acetyl butyrolactone. The latter is a water-white liquid boiling at 107°–108° C. at five mm. pressure with a specific gravity at 20/20 of 1.185–1.189.

As an example of the improved procedure, 450 cc. of 38% hydrochloric acid, 500 cc. of water and 512 grams (4 mols) of acetylbutyrolactone are placed in a two-liter flask fitted with a two-plate bubble cap fractionating column, condenser, separator and seal to permit continuous return of the water layer from the separator to the column. The contents of the flask are heated to boiling and thereafter acetylbutyrolactone and hydrochloric acid are fed separately into the flask in mol for mol proportions. The condensed distillate consisting of water, hydrochloric acid and acetylpropyl chloride flows into the separator where the acetylpropyl chloride separates as the bottom layer and is continuously withdrawn. The upper aqueous layer is split into two parts. One part is returned to the top of the column to act as a reflux. The remainder of the aqueous layer is discarded. The carbon dioxide formed during the reaction escapes from the top of the separator. The wet acetylpropyl chloride may be dried by removal of the water under decreased pressure, for example by fractionation at 20 mm. pressure. The yield of acetylpropyl chloride so obtained is 88.5% of the theoretical.

The procedure as described avoids the difficulties inherent in the method employing acetylpropyl alcohol, which is effective to produce yields of only 50%–60%, whereas the yield in accordance with the present invention is approximately 90%. The procedure is simple and effective, and it is well adapted for operation on a commercial basis.

Various changes may be made in the procedure as described without departing from the invention or sacrificing the advantages thereof.

I claim:

The method of preparing acetylpropyl chloride which comprises reacting acetylbutyrolactone with aqueous hydrochloric acid in substantially mol for mol proportions at the boiling point of the mixture, withdrawing and condensing the vapor and separating the acetylpropyl chloride from the condensate.

SYLVAN E. FORMAN.